(12) United States Patent
Lewis

(10) Patent No.: US 8,272,115 B2
(45) Date of Patent: Sep. 25, 2012

(54) MULTI-PLATE CLUTCH AND METHOD

(76) Inventor: Leif Lewis, Valley Village, CA (US)

( * ) Notice: Subject to any disclaimer, the term of this patent is extended or adjusted under 35 U.S.C. 154(b) by 477 days.

(21) Appl. No.: 12/580,850

(22) Filed: Oct. 16, 2009

(65) Prior Publication Data
US 2010/0084242 A1 Apr. 8, 2010

Related U.S. Application Data

(63) Continuation-in-part of application No. 11/115,939, filed on Apr. 27, 2005, now abandoned.

(51) Int. Cl.
B23P 6/00 (2006.01)
F16D 13/64 (2006.01)

(52) U.S. Cl. ............... 29/401.1; 29/402.08; 192/70.13; 192/70.2

(58) Field of Classification Search ............ 192/70.19, 192/70.2
See application file for complete search history.

(56) References Cited

U.S. PATENT DOCUMENTS

| | | | | |
|---|---|---|---|---|
| 1,415,841 A * | 5/1922 | Seitz | | 192/70.2 |
| 1,467,732 A * | 9/1923 | Litle, Jr. | | 192/70.2 |
| 1,518,604 A * | 12/1924 | Rosner | | 192/70.2 |
| 3,760,921 A * | 9/1973 | Gillespie | | 192/70.2 |
| 4,139,085 A | 2/1979 | Kanbe et al. | | |
| 4,173,269 A | 11/1979 | Craig | | |
| 4,450,944 A | 5/1984 | Fujioka et al. | | |
| 4,548,306 A | 10/1985 | Hartz | | |
| 4,643,289 A | 2/1987 | Yoneda et al. | | |
| 4,730,713 A | 3/1988 | Pickard et al. | | |
| 4,958,712 A | 9/1990 | Suganuma et al. | | |
| 5,094,331 A | 3/1992 | Fujimoto et al. | | |
| 5,386,899 A | 2/1995 | Sterling et al. | | |
| 5,638,932 A | 6/1997 | Mizukami | | |
| 5,687,821 A | 11/1997 | Lorriette | | |
| 5,701,986 A | 12/1997 | Lorriette | | |
| 5,722,524 A | 3/1998 | Mizukami et al. | | |
| 5,743,369 A | 4/1998 | Lorriette | | |
| D402,299 S | 12/1998 | Mizukami | | |
| 5,904,234 A | 5/1999 | Kosumi et al. | | |
| 6,026,944 A | 2/2000 | Satou et al. | | |
| 6,116,397 A | 9/2000 | Kosumi et al. | | |
| 6,116,398 A | 9/2000 | Kosumi et al. | | |
| 6,915,892 B2 * | 7/2005 | Bauer et al. | | 192/70.2 |
| 2002/0006832 A1 * | 1/2002 | Glowacki et al. | | 464/180 |
| 2004/0084274 A1 * | 5/2004 | Schreiber et al. | | 192/70.2 |

FOREIGN PATENT DOCUMENTS

| | | | | |
|---|---|---|---|---|
| JP | 59086716 A | * | 5/1984 | |
| JP | 03009119 A | * | 1/1991 | |
| JP | 10089381 A | * | 4/1998 | |

* cited by examiner

*Primary Examiner* — Rodney Bonck
(74) *Attorney, Agent, or Firm* — Fulwider Patton LLP

(57) ABSTRACT

A multi-plate clutch includes a plurality of drive plates that are rotationally coupled to a concentric shell wherein keys radially extending from each drive plate are slidably received in axial channels formed in the interior surface of the shell. The enhancement of the wear resistance of the keys of single one of the drive plates serves to extend the service life of the entire clutch.

5 Claims, 5 Drawing Sheets

MULTI-PLATE CLUTCH AND METHOD

CROSS-REFERENCES TO RELATED APPLICATIONS

This application is a continuation-in-part of U.S. Ser. No. 11/115,939 filed on Apr. 27, 2005.

BACKGROUND

The present invention generally relates to multi-plate clutches and more particularly pertains to the extension of the service life of such devices as well as the reduction of the noise that is typically generated thereby.

Clutches are employed for interruptably coupling two rotating components to one another such as for example an engine to a transmission. A multi-plate clutch configuration offers significant advantages over a single-plate clutch configuration including the ability to accommodate a greater torque handling capability in an overall smaller package. As a consequence, such clutch configurations are found in a large variety of different applications including high-performance motorcycles and automobiles, trucks and heavy machinery. There are however some disadvantages associated with multi-plate clutch devices, including the propensity for the accelerated wear of its component parts and the noise that is caused by the interaction of the wearing parts.

In general terms, a multi-plate clutch employs a stack of drive plates and driven plates (friction plates) that are concentrically arranged in an alternating sequence along a common axis wherein one of the two sets of plates is keyed to an internally disposed shaft or carrier while the alternating set of plates is keyed to an externally disposed cylindrical shell or basket. The cylindrical shell is typically coupled to an engine while the internally disposed shaft is typically coupled to a transmission. Configurations in which the drive plates are steel and the driven plates are made of or coated with a friction material as well as configurations in which the drive plates are made of or coated with friction material and the driven plates are steel are both well known in the art. When the stack is compressed, the plate faces engage to become rotationally joined to one another and are thereby able to effectively transfer torque from the shell to the shaft or from the shaft to the shell. In the absence of a compressive force, the plates disengage and are free to spin relative to one another thereby interrupting the transfer of torque between the external shell and the internal shaft.

In keying the one set of plates to the externally disposed shell, it is essential that the plates remain readily axially shiftable relative thereto while being rotationally locked thereto. Each plate must be capable of axially shifting slightly as the stack of plates is compressed so as to take up the slack between the plates which had allowed the alternating plates to freely spin relative to one another. Conversely, when the compressive force is released, the plates must be able to readily shake free from the adjacent plates in order to rotationally decouple the shaft from the shell. This is typically accomplished by forming axially extending channels or slots in the externally disposed shell that are dimensioned to receive keys that are formed about the outer circumference of each plate. Each plate is thereby rotationally locked to the shell as one of the edges of each of the keys engages one or the other sidewall of the channel in which it resides while the keys are free to shift along the channels.

In order to ensure that the axial movement of the keys remains uninhibited under all operating conditions, the widths of the keys are typically selected to be slightly undersized relative to the widths of the channels. While this achieves the intended effect, it is the underlying cause of a number of shortcomings inherent in multi-plate clutches. The gap between the leading edge of each key and the sidewall of the channel allows the keys of each plate to slam into the respective channel sidewall or for the respective channel to slam into the keys with each change in the direction of torque transfer. This becomes especially problematic in automotive and motorcycle applications as such impacts will occur with every upshift and downshift, with every switch between accelerative loading and decelerative loading while in a gear and even when in neutral, as each firing pulse will cause the engine's output to undergo a brief acceleration and deceleration. These impacts not only generate noise and vibration, but cause the keys and/or channels to wear. Any such wear accelerates the rate of further wear along with a commensurate increase in noise and vibration as the impacts become harsher until the clutch becomes unserviceable.

A number of different approaches have heretofore been taken in effort to address the above-described problem inherent in multi-plate clutches. Reducing the tolerances between the keys and channels has generally been found to be of limited utility as the function of the clutch quickly becomes compromised. Close tolerances between the keys of each of the plates and the corresponding channels renders the keys prone to binding or jamming in the channels should the plates and/or associated keys become distorted, angled or otherwise misaligned. Such binding or jamming would prevent or delay the clutch from decoupling the driving and driven components when the compressive force is released thereby making it difficult to select neutral or shift gears. Conversely, binding or jamming could prevent or delay the clutch from effectively coupling the driving and driven components when the stack of plates is compressed. Most efforts have therefore focused on damping the impact of the leading edge of each key with the sidewall of the channel.

A well known approach entails the submersion of the entire clutch mechanism in a fluid wherein the fluid naturally fills any gaps and thereby serves to dampen the impact between a key and the sidewall. This is highly effective, greatly increases service life and reduces or even eliminates the noise. However, the oil used in so-called "wet" clutches introduces a significant amount of drag to thereby rob power and increase fuel consumption. Additionally, in four stroke motorcycle applications, such clutches tend to contaminate the engine oil.

An alternative approach entails the use of mechanical damping devices such as springs or O-rings that are fitted to or about the key/channel interface so as to buffer the impacts between the engaging surfaces. While such modifications have been found to be somewhat effective in reducing the impact loads and the associated noise and damage, the added components not only add complexity to the clutch mechanism but are more prone to failure. Damaged or broken metallic parts that come loose can cause further damage to the clutch and difficulty in its operation while broken O-rings can prevent plates from separating and shaking apart.

A multi-plate clutch configuration is needed that overcomes the shortcomings of presently known multi-plate configuration. It is most desirable to provide a multi-plate clutch that is not as prone to excessive wear rates, that does not generate noise during its operation and that does not suffer from the complexity of presently known efforts to address wear and noise. Additionally, it is most desirable to provide a means for modifying or retrofitting existing multi-plate clutches so as to extend service life.

SUMMARY OF THE INVENTION

The present invention overcomes the shortcomings of previously known multi-plate clutches wherein the improved clutch configuration provides for a substantially extended service life and for the reduced generation of noise during its operation. Such gains are realizable in dry as well as wet type applications. Additionally, the present invention provides for a kit and method for retrofitting an existing clutch in order to extend its service life.

The modification of just one of the drive plates in accordance with the present invention had unexpectedly been found to extend the service life of all of the other drive plates and hence of the entire multi-plate clutch. Accordingly, the present invention generally provides for the differentiation of just one of the drive plates of a multi-plate clutch so as to be less prone to wear. The differentiation of such drive plate or "stabilizer plate" so as to be less prone to wear is achievable via of a number of different modifications of a previously known drive plate such as for example with an increase in its key thickness, an increase in its key width, a hardening of its keys or any combination thereof relative to the other drive plates in the multi-plate clutch. By leaving the other drive plates substantially unaltered, the ability of such plates to function as originally designed is preserved such as their ability to shift axially and readily disengage when the clutch is disengaged. Upon engagement of the clutch, the movement of the other drive plates in the clutch pack is controlled by the movement of the stabilizer plate to the extent that any rotation beyond the position of the stabilizer plate is subject to the friction between the stack of plates. Consequently, the impact of the sidewalls of the channels of the outer shell with the keys of the other plates or vice versa is greatly dampened and wear is reduced.

In a preferred embodiment of the present invention, the multi-plate clutch includes a stack of drive plates and driven plates that are disposed in a conventional configuration to the extent that they are arranged in an alternating sequence along a common axis wherein the set of driven plates is keyed to an internally disposed shaft or carrier which is rotationally coupled to a transmission and wherein the set of drive plates is keyed to an externally disposed shell which is rotationally coupled to an engine. Each of the drive plates includes a series of keys or tabs that extend radially therefrom and that are configured for receipt in axially extending channels that are formed along the interior surface of the cylindrical shell or in axially extending slots that completely extend through the shell. In accordance with the invention, the stabilizer plate has a configuration similar to that of the other drive plates and is similarly keyed to the externally disposed shell but is differentiated in terms of its keys' resistance to wear. Such enhanced resistance to wear is achieved by for example an increase in the thickness and/or width of the keys and/or a hardening of the keys or any combination thereof. Once the keys of the other drive plates have worn to a width equal to the width of the keys of the stabilizer plate or if the width of the keys of the stabilizer plate is greater than the width of the keys of the other drive plates, further wear of the keys of the other drive plates is curtailed as the initial impact with the channels is henceforth borne by the keys of the stabilizer plate. The rate of further wear is subsequently controlled by and limited to the rate of wear of the keys of the stabilizer plate which are substantially more resistant to wear to thereby correspondingly slow the rate of wear of the entire clutch pack. A stabilizer plate with thicker keys will be less prone to wear because the impact with outer shell will be distributed over a larger area to reduce the loads as well as the fact that there is more material to wear. A stabilizer plate with hardened keys will be less prone to wear directly due to the harder wear surface. A stabilizer plate with thicker and harder keys will be even less prone to wear. A stabilizer with wider keys will serve to reduce the gap between the keys and the channel walls in the outer shell to thereby decrease the time available for relative acceleration between the stabilizer plate and the outer shell to thereby correspondingly reduce the relative speed at impact and consequently reduce the forces involved which in turn reduces the rate of wear.

Upon compression of the stack of drive plates and driven plates, the stabilizer plate serves to stabilize the rotational position of all of the other plates in the stack relative to the channels in the shell. Because all of the other drive plates are frictionally linked to the stabilizer plate, any rotation relative to the stabilizer plate and therefore relative to the channels in the shell requires that such friction be overcome. Overcoming the friction requires a substantial amount of force which in turn greatly reduces the relative rotational velocity that can be achieved. The much reduced relative rotational velocity in turn greatly reduces the force with which the keys and the sidewalls of the respective channels impact one another. This substantially reduces wear to the engaging surfaces and all but eliminates the generation of a hammering noise.

The stabilizer plate of the present invention can initially be incorporated in new multi-plate clutches or can be retrofitted to existing clutches and even to clutches that had already been placed in service. Installation or incorporation in a new clutch will provide for a long service life ab initio while retrofitment to an existing clutch will greatly reduce the rate of further wear to thereby extend its service life. Retrofitment may be quickly and easily accomplished by removing the pressure plate and outermost driven plate, removing the outermost drive plate and replacing it with the stabilizer plate. In some applications the outermost driven plate can be reused. In other combinations, a specially dimensioned driven plate (friction plate) must be used to complement the configuration of the stabilizer plate. Replacement of the pressure plate completes the retrofitment process.

A multi-plate clutch can additionally be configured to take even fuller advantage of the stabilizer plate of the present by for example employing a hardened outer shell and/or with the use of drive plate and outer shell combinations that include a greater number of teeth and channels, precision machined teeth and channels for a more precise fit as well as the Teflon coating of various parts to further reduce friction. Further, the shell may have a second set of channels dedicated exclusively for the receipt of the keys of the stabilizer plate. Alternatively, a separate pin and slot arrangement may be relied upon to achieve the desired restriction in rotational freedom. It is contemplated that other mechanisms may also be adapted to achieve the objectives of the present invention.

These and other features and advantages of the present invention will become apparent from the following detailed description of the preferred embodiments which, taken in conjunction with the accompanying drawings, illustrate by way of example the principles of the invention.

DETAILED DESCRIPTION OF THE PREFERRED EMBODIMENTS

The present invention overcomes many of the shortcomings of previously known multi-plate clutch configurations to provide longer service life and quieter operation. The inclusion of a differentiated drive plate, referred to herein as a stabilizer plate, in combination with conventional drive plates serves to rotationally stabilize the entire clutch pack without impeding the clutching and declutching operations. The stabilizer plate is differentiated relative to the other drive plates so as to be less prone to wear. Due to the stabilizer plate's frictional interaction with the other drive plates, their rate of wear becomes limited by and cannot exceed the rate of wear of the stabilizer plate. A longer service life for the entire multi-plate clutch is thereby provided.

Figure 1:
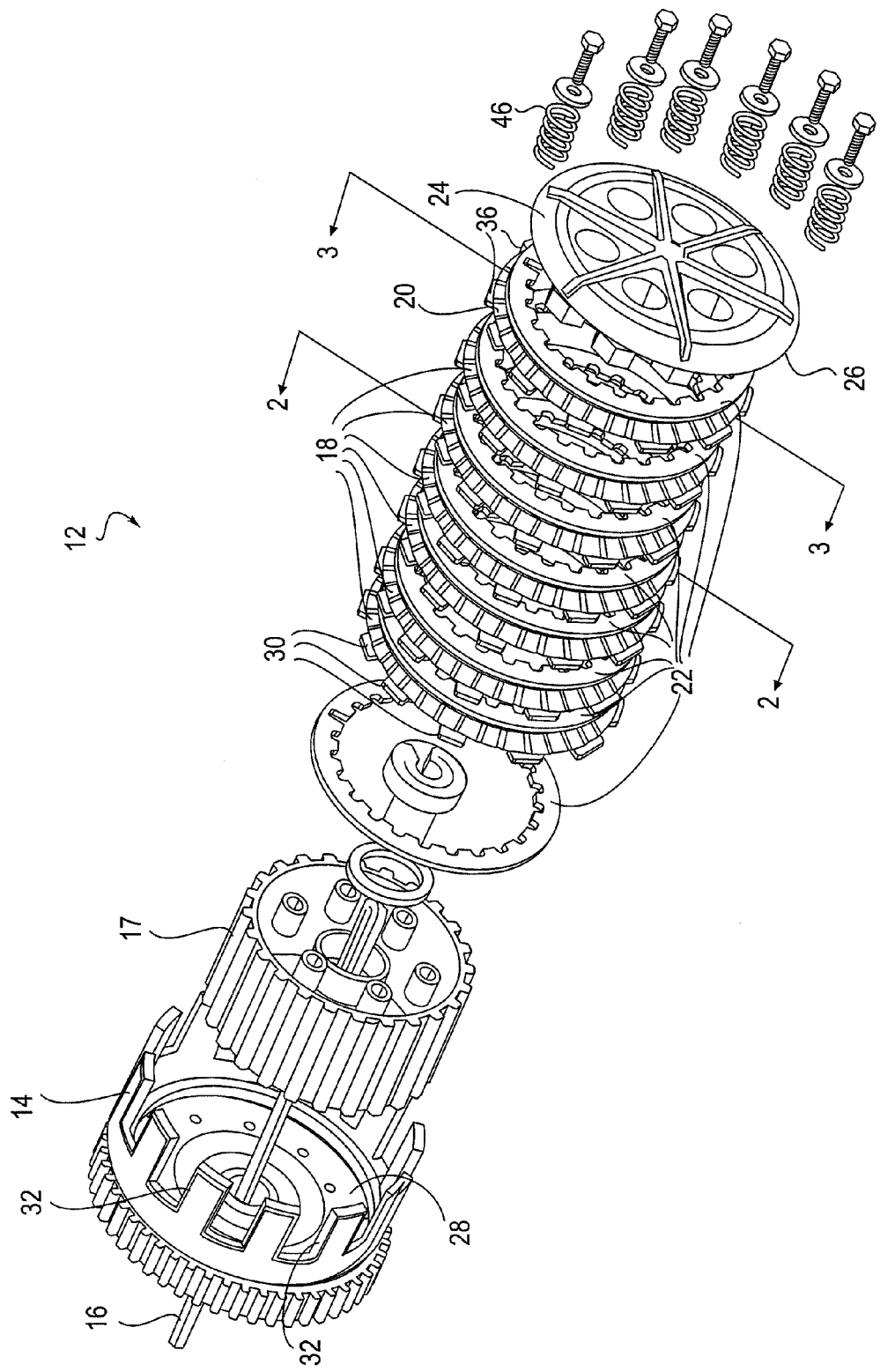
FIG. 1 is an exploded perspective view of a preferred embodiment of the multi-plate clutch configuration of the present invention.

FIG. 1 is an exploded perspective view of a preferred embodiment of the present invention. The multi-clutch 12 serves to interruptably transfer torque between for example an engine (not shown) that is rotationally coupled to the clutch's outer shell 14 and a transmission (not shown) that is rotationally coupled to the clutch's output shaft 16. Power transfer is achieved by the compression of an alternating sequence of coaxially arranged drive plates 18, including one drive plate 20 (hereinafter referred to as a stabilizer plate) that is differentiated relative to the other drive plates so as to be less prone to wear, and driven plates 22 against one another wherein the drive plates are rotationally coupled to the shell while the driven plates are rotationally coupled to the output shaft via a carrier 17. In this particular embodiment, the drive plates and stabilizer plate are rotationally coupled to the shell by keys 30, 36 that are received within slots 32 that are formed in the shell 14. Although the clutch pack that is shown in this particular illustration includes of a total of seven drive plates and eight driven plates, the present invention can be adapted to clutch packs with higher or lower plate counts. Compression of the clutch pack is accomplished by the action of a pressure plate 24 that is disposed at one end of the shell. A spring-loaded engaging surface 26 that extends therefrom serves to force the entire clutch pack 18, 20, 22 against another engaging surface 28 that is disposed on the opposite end of the shell to thereby cause adjacent plate faces to tightly engage one another. Release of the plates from engagement is achieved by countering the spring force generated by the pressure plate with an actuation mechanism such as the foot operated hydraulic mechanism typically employed in automotive applications or the hand operated mechanism typically employed in motorcycle applications.

The differentiation of the stabilizer plate 20 relative to the other drive plates 18 may be accomplished in a number of different ways or by a combination of such ways. For example, the stabilizer plate 20 may have keys 36 that are harder than the keys 30 of the other drive plates. This may be achieved by a hardening of the keys 36 or of the entire stabilizer plate 20 by for example hard anodizing process as is commonly used for forming a thick oxide layer that is harder than the underlying metal. Other treatment or plating processes are also well known to provide a hardened surface. Alternatively, the entire stabilizer plate may be formed of a material that is harder than the material with which the other drive plates.

Figure 2:
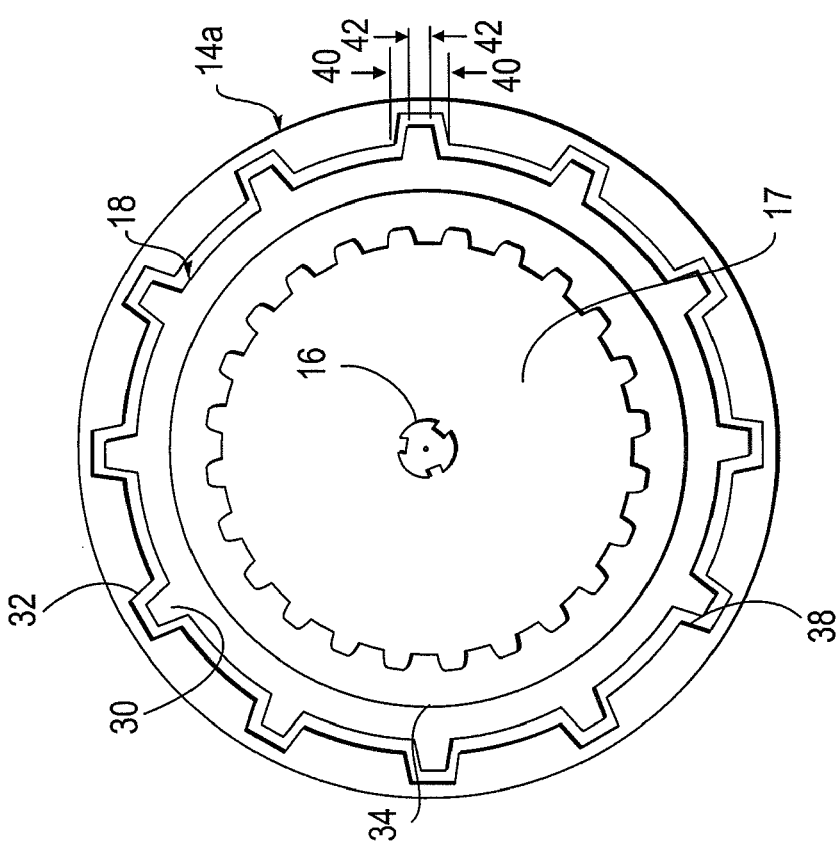
FIG. 2 is a transverse cross-sectional view of an alternative embodiment taken along the equivalent of lines 2-2 in FIG. 1.

FIG. 2 is a cross-sectional view of an alternative embodiment of the present invention taken along the equivalent of lines 2-2 in FIG. 1. In this particular embodiment, the shell 14a has channels 32a formed therein as opposed to the slots 32 that are formed in the shell 14 shown in FIG. 1. The drive plate 18 is rotationally coupled to the outer shell by keys 30 that extend radially from the periphery of the drive plate that are received in channels 32a formed in the interior surface of the outer shell. While a configuration with a total of twelve keys for receipt in twelve channels is shown for illustration, the present invention is readily adaptable to clutch configurations relying on any number, shape and placement of keys. The channels formed in the inner surface of the outer shell 14 may be of any depth including extension completely there through. The engaging surface 34 is configured to frictionally engage a similarly configured engaging surface of an adjacent driven plate. The gaps 38 that are shown between the edges of the keys and the sidewalls of the channel are exaggerated for illustrative purposes. Nonetheless, the width 42 of the keys are selected to be significantly less than the width 40 of the channels in order to ensure that the drive plates are free to shift axial along the channels during the clutching and declutching operations. The actual widths and actual differences in the widths is of course dependent upon the particular clutch configuration and application.

Figure 3:
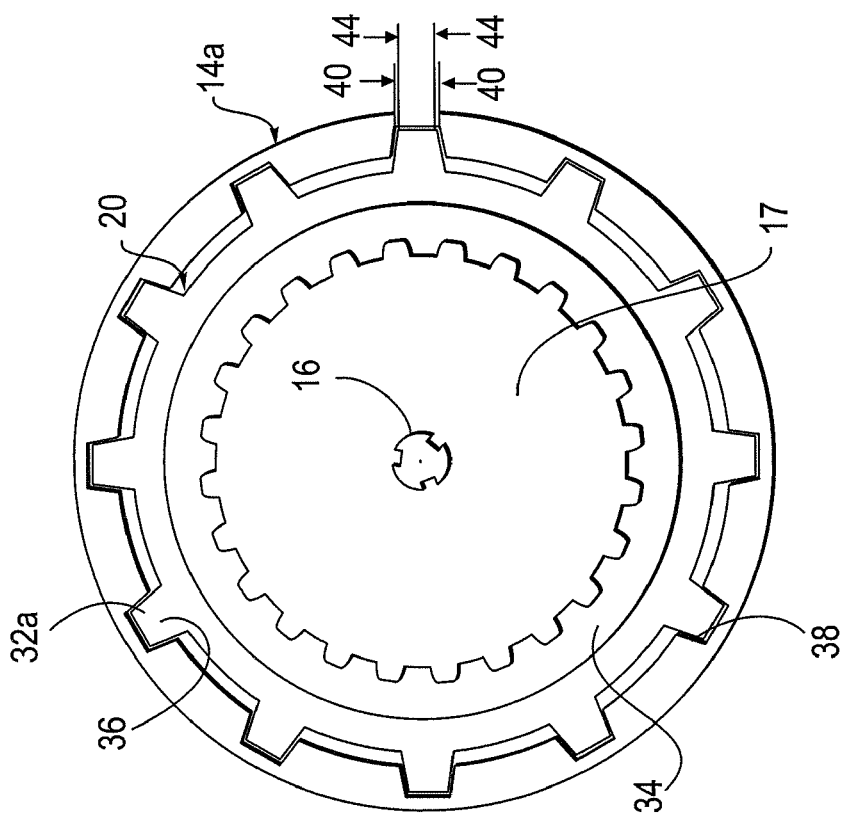
FIG. 3 is a transverse cross-sectional view of an alternative embodiment taken along the equivalent of lines 3-3 in FIG. 1.

FIG. 3 is a cross-sectional view of the same alternative embodiment illustrated in FIG. 2 taken along the equivalent of lines 3-3 in FIG. 1. The stabilizer plate 20 is rotationally coupled to the outer shell 14a by keys 36 that extend radially from the periphery of such drive plates that are received in channels 32a formed in the interior surface of the outer shell. The engaging surface 34 is configured to frictionally engage a similarly configured engaging surface of an adjacent driven plate. While the stabilizer plate has the same configuration as the drive plate 18, the plates are differentiated in terms of the dimensions of certain features. More particularly, the keys have a width 44 that more closely corresponds to the width of the channels 32a. Consequently, essentially no gap is shown between the edges of the keys and the channels. The actual widths and actual differences in the widths is of course dependent upon the particular clutch configuration and application. Essential to this alternative embodiment of the present invention is that the gaps between the keys 36 of the stabilizer plate 20 and the channels 32a are selected to be significantly less than the gaps between the keys 30 of the drive plates 18 and such channels. A stabilizer plate wherein the difference between the widths of its keys and the width of the channel is half as great as the difference between the width of the keys of other drive plates and the channels may yield the desired rotational stability without compromising clutch operation in some applications. A much greater difference in gap widths may be effective in other applications. For example, a difference in widths of a about 1:20 has been found to be effective in the clutch of a Ducati® 996 or 999, wherein stabilizer plate with a gap of only 0.001" cooperates with the other drive plates which are dimensioned to have gaps of about 0.020". The stabilizer plate 20 or its keys 36 may additionally be hardened as described above.

Figure 4:
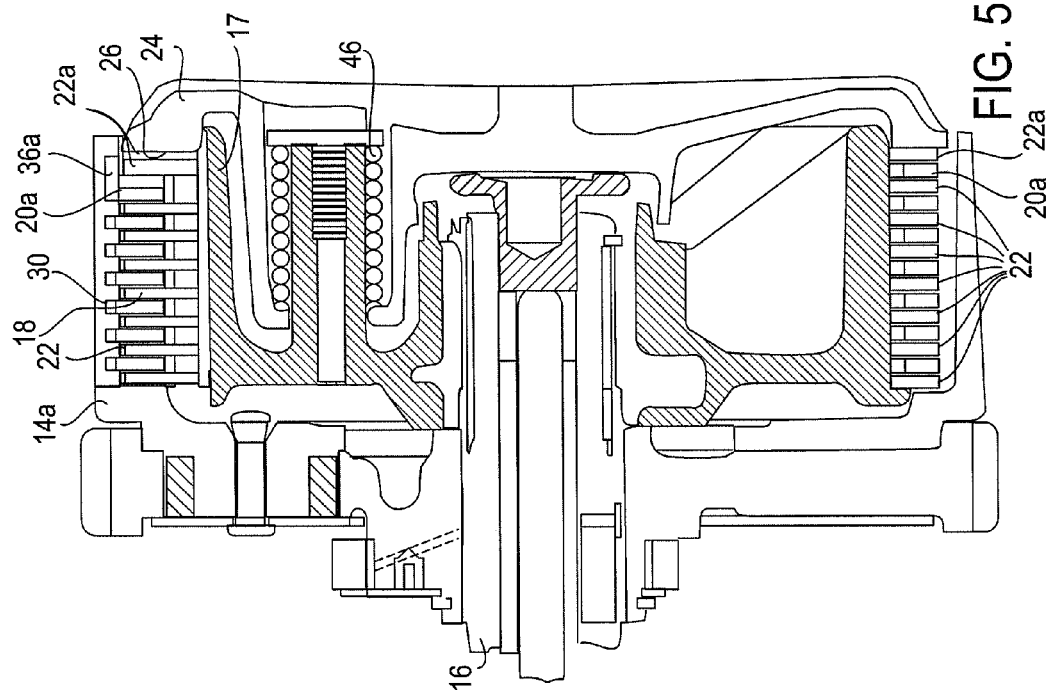
FIG. 4 is a longitudinal cross-sectional view of another alternative embodiment of the clutch of the present invention with the clutch pack in its compressed state.

FIG. 4 is a longitudinal cross-sectional view of an alternative embodiment of the present invention in which the stabilizer plate 20a is differentiated from the other drive plates 18 by its substantially thicker keys 36a. Increasing the thickness of the keys has been found to be most advantageous as it provides for more contact area across which impact loads are distributed as well providing for more wear surface, i.e. material to wear to thereby further reduce wear rates. Additionally shown is a modified driven plate 22a that is configured to precisely fit within the recess defined by the overhanging key 36a structure. Such configuration is especially advantageous for use in certain retrofit applications wherein the overall thickness of the entire stack of plates must be maintained while nonetheless providing for a substantial increase in the stabilizer plate's key thickness. Certain other applications can accommodate a further thickness of the keys of the stabilizer plate such that they protrude radially beyond the engaging surface 26 and about the periphery of the pressure plate 24. Other applications can readily accommodate a thicker stack of plates obviating the need to form a recess in the stabilizer plate wherein the stabilizer plate is thicker than the other drive plates in its entirety. An overall thicker stabilizer plate provides further advantages to the extent that it serves to prevent flexure or distortion of the plate in general and the keys in particular which may otherwise cause the tightly dimensioned keys to bind or jam in their respective channels. A thicker stabilizer plate also serves to increase longevity by holding a closer tolerance longer. It has been found that doubling the thickness of the stabilizer plate is most effective and can be accommodated in many clutch configurations without further modification. For retrofit applications it is most advantageous to position the stabilizer plate in the outer most position such that the retrofitmet process only requires the removal of the pressure plate and a single drive plate and driven plate. It should be noted that while FIG. 4 shows the clutch in its compressed state wherein springs 46 associated with the pressure plate urge its engaging surface 26 against the clutch pack to cause all adjacent surfaces to be fully engaged while FIG. 5 shows the clutch in its uncompressed state wherein springs 46 have been compressed to cause all adjacent engaging surfaces to disengage and to thereby interrupt the transfer of torque between the outer shell 14a and the output shaft 16.

Figure 5:
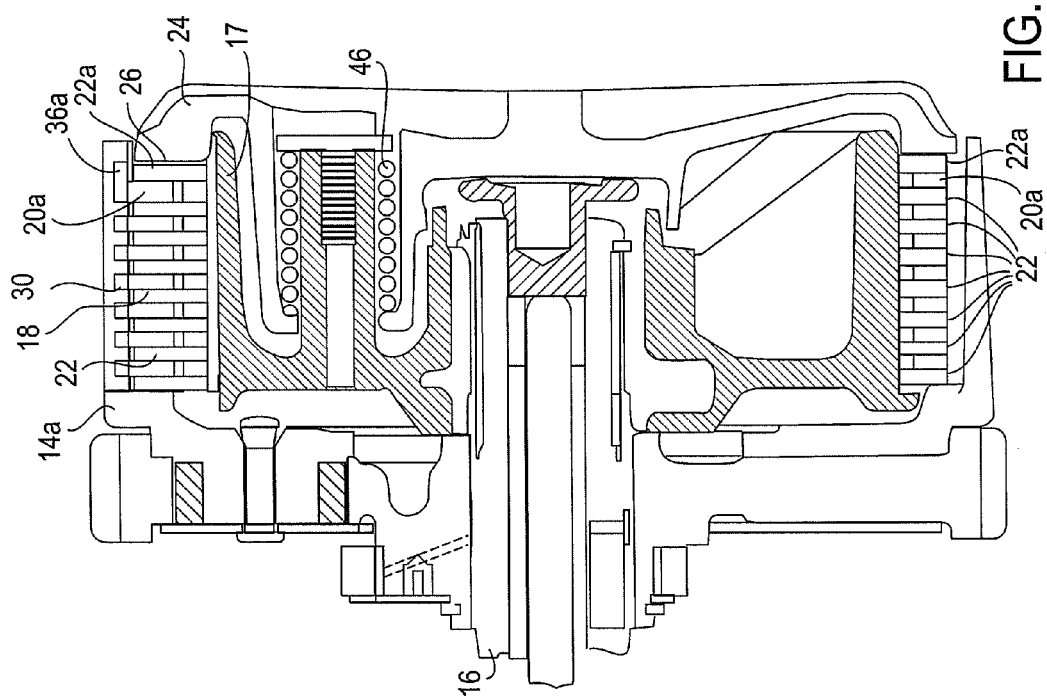
FIG. 5 is a longitudinal cross-sectional view of the alternative embodiment shown in FIG. 4 with the clutch pack in its uncompressed state.
Figure 6:
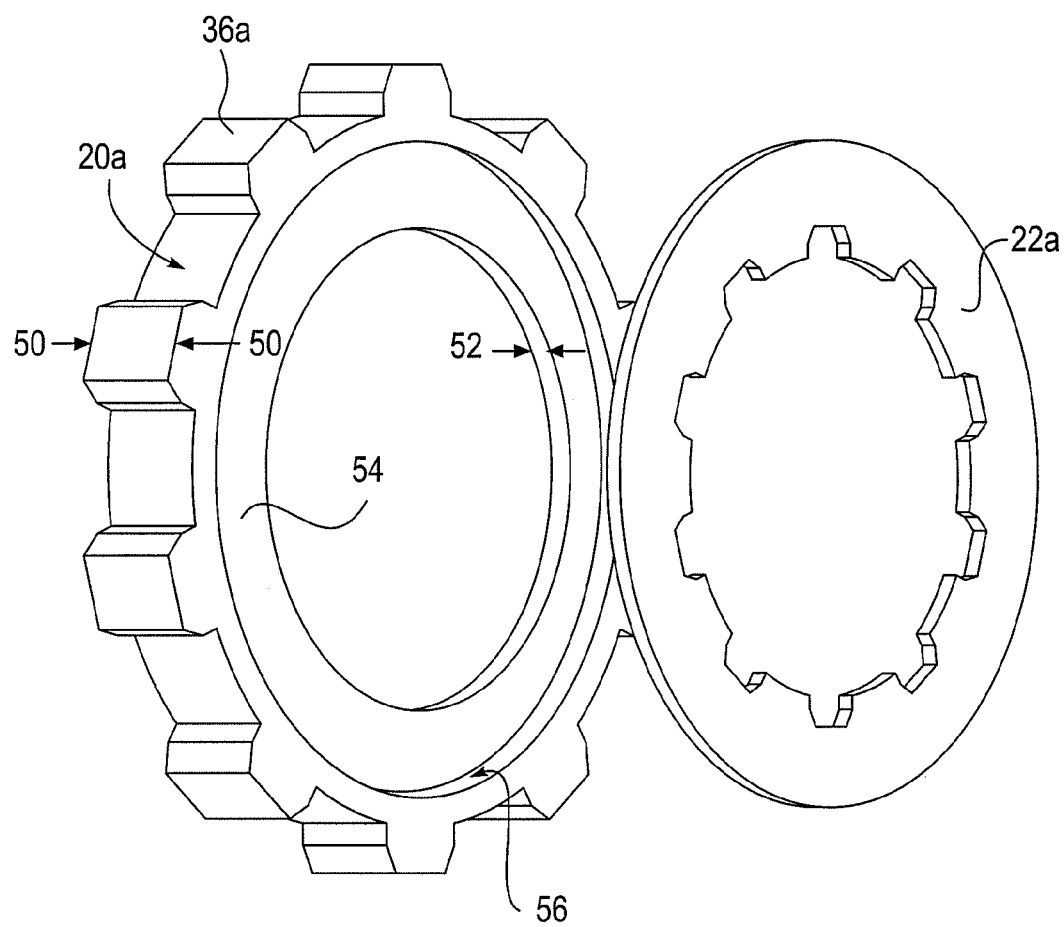
FIG. 6 is perspective view of the stabilizer plate and friction plate shown in FIGS. 4 and 5.

FIG. 6 is a perspective view of the stabilizer plate 20a and driven plate 22a shown in FIGS. 4 and 5. This view clearly shows the substantially greater thickness 50 of the keys 36a relative to thickness 52 of the section 54 for engaging adjacent driven plates 22, 22a. The configuration shown defines a recess 56 which serves to receive an adjacent driven plate 22a which in turn is precisely dimensioned to fit thereinto. It is additionally most desirable to harden at least the keys of the stabilizer plate. A low friction coating, such as Teflon, may also be applied to the keys to facilitate axial shifting relative to the channels of the outer shell. The keys may also be configured with a wider dimension such as is shown in FIG. 3.

The embodiment shown in FIG. 6 is especially well adapted for retrofitment applications requiring the removal of only the outermost drive plate and a single driven plate of a multiplate clutch after having removed the pressure plate, the fitment of the stabilizer plate 20a and driven plate 22a combination and the replacement of the pressure plate. Such retrofitment will serve to greatly extend the service life of the other drive plates and hence the entire clutch irrespective of whether the clutch is new or had already been placed in service.

Figure 7:
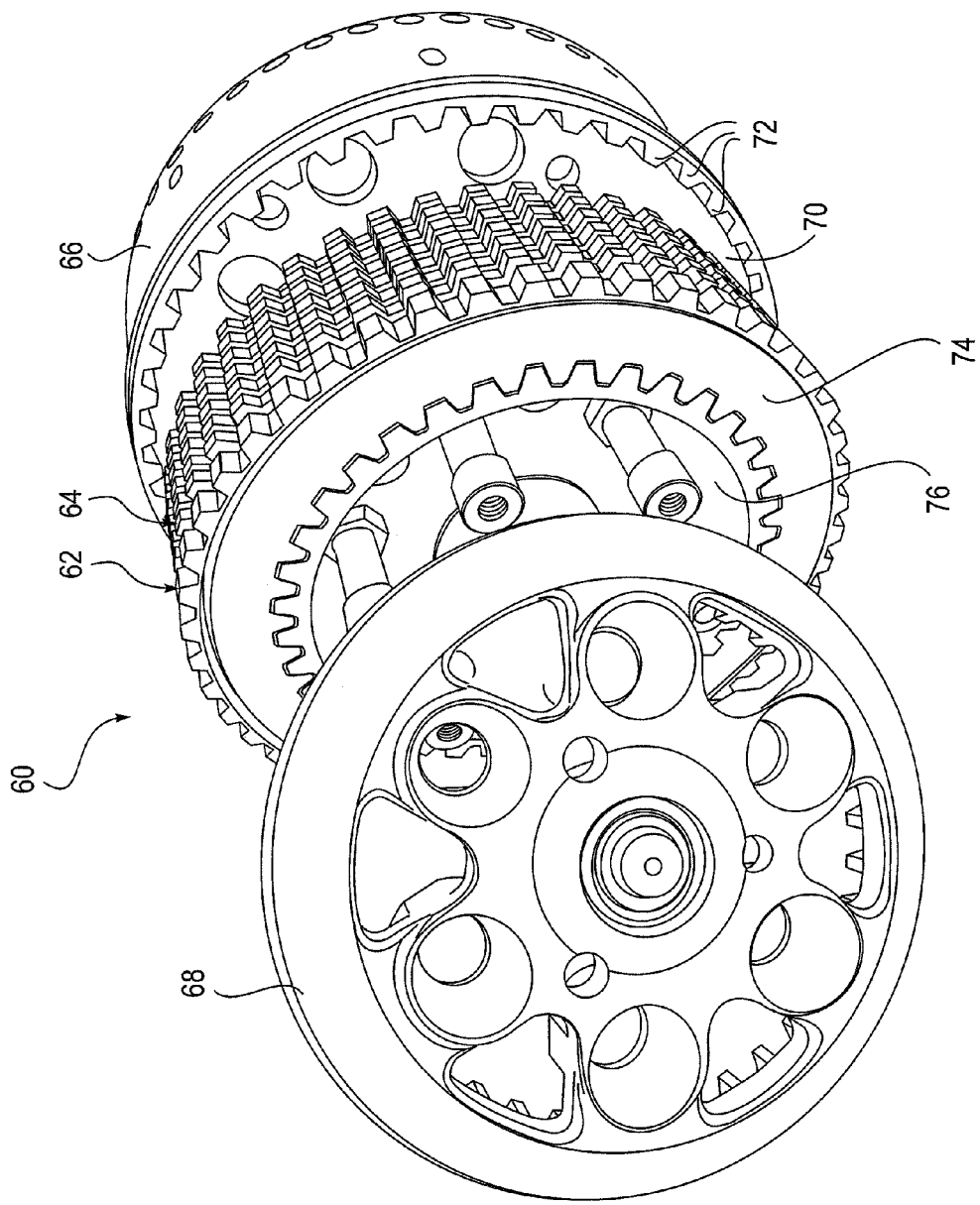
FIG. 7 is a perspective view of a partially disassembled further alternative embodiment of the present invention.

FIG. 7 is a partially disassembled further alternative embodiment of the present invention. The clutch system 60 includes a stabilizer plate 62 and drive plates 64 having 48 keys that engage 48 channels formed in the interior surface of the outer shell 66. The keys and channels are precision machined (rather than for example stamped) to provide extremely precise and consistent spacing between the keys and the channels in which they are received. The keys 70 of the stabilizer plate 62 are approximately twice as thick as the keys 72 of the other drive plates 64. The outermost driven plate 74 is precisely dimensioned for receipt within a recess 76 formed in the outer surface of stabilizer plate within the circumference of the overhanging keys. The pressure plate 68 is dimensioned such that its outer circumference is slightly less than the inner circumference of the overhanging keys. All parts are hard anodized.

The present invention can be adapted to any of a number of different clutch configurations in use today. In addition to "dry" applications, the invention is readily adaptable to "wet" configurations wherein the entire clutch pack is immersed in an oil to further dampen impacts between engaging surfaces. Moreover, the present invention can be adapted to clutches for use in conjunction with any of a variety of manual transmissions as well as to clutches that are used within some automatic transmissions wherein multi-plate clutch packs perform a similar function. It should also be noted the invention can readily be adapted for use in multi-plate braking systems such as are in use in aircraft wherein torque is transferred between rotating wheels and stationary brake discs.

Finally, it should be noted that the present invention can also be practiced by differentiating channel width rather than key width. Channels having a stepped width, wherein a reduced width is limited to an area of the channels that are exclusively contacted by the keys of a single one of a series of identical drive plate, would serve the same purpose. Alternatively, a set of channels with a reduced width can be dedicated to the keys of a single one of a series of identical plates wherein the channels of reduced width and the channels of nominal width are rotationally offset from one another. As a further alternative, a completely different coupling mechanism may be relied upon to rotationally couple the stabilizer plate to the shell so as to achieve the desired reduction in rotational play. It is also conceivable that the stabilizer plate may be rotationally coupled directly to the pressure plate in an appropriate multi-plate clutch configuration in which the pressure plate is linked to the shell in order to achieve the desired rotational stabilization while the clutch pack is in its compressed state.

While a particular form of the invention has been illustrated and described, it will also be apparent to those skilled in the art that various modifications can be made without departing from the spirit and scope of the invention. More particularly, the present invention can readily be adapted to a number of other multi-plate configurations including, for example, wherein the drive plates are coupled to a centrally disposed carrier while the driven plates are coupled to an outer shell. Additionally, the present invention covers any permutation of which plates are made of steel and which plates are made or layered with a friction material. Accordingly, it is not intended that the invention be limited except by the appended claims.

I claim:

1. A method for extending the service life of a multi-plate clutch for interruptably transferring torque between an engine and a transmission, wherein such multiplate clutch includes an internal shaft rotationally coupled to said transmission, a plurality of first plates each concentrically arranged about and along said shaft and rotationally coupled thereto, a cylindrical shell rotationally coupled to said engine and concentrically disposed about said internal shaft and first plates, a plurality of identical second plates concentrically arranged along said shaft in an alternating sequence relative to said first plates, each having a section for frictionally engaging adjacent first plates and rotationally coupled to said cylindrical shell via keys that are received in voids formed in said cylindrical shell, and a pressure plate for compressing said first plates and second plates against one another so as to rotational couple said engine to said transmission, comprising:

removing only one of said second plates;

replacing said removed second plate with a stabilizer plate having a section for frictionally engaging adjacent first plates and keys for receipt in said voids formed in said cylindrical shell, wherein such keys are less prone to wear than the keys of said second plates, wherein such keys of said stabilizer plate are thicker than the keys of said second plates, wherein said section for frictionally engaging adjacent first plates of said stabilizer plate and the sections for frictionally engaging adjacent first plates of said second plates have substantially similar thicknesses, wherein said keys of said stabilizer plate are thicker than said section for frictionally engaging adjacent first plates, and wherein one side of said section for frictionally engaging adjacent first plates is axially recessed relative to said keys; and replacing only one of said first plates with a substitute first plate configured for receipt within said recess.

2. The method of claim 1, wherein said keys of said stabilizer plate are wider than the keys of said second plates.

3. The method of claim 1, wherein said keys of said stabilizer plate are harder than the keys of said second plates.

4. The method of claim 3, wherein said stabilizer plate is hard anodized.

5. The method of claim 1, further comprising:

removing said pressure plate;

removing only the first plate and second plate that are nearest said pressure plate for replacement by said stabilizer plate and said substitute first plate;

replacing said pressure plate.

* * * * *